(12) United States Patent
Quinn et al.

(10) Patent No.: US 9,069,869 B1
(45) Date of Patent: Jun. 30, 2015

(54) STORING ON A CLIENT DEVICE DATA PROVIDED BY A USER TO AN ONLINE APPLICATION

(75) Inventors: Christopher N. Quinn, Del Mar, CA (US); Anthony L. Creed, San Diego, CA (US); David W. Burklund, San Diego, CA (US); Kenichi Mori, Carlsbad, CA (US); Jason J. Casseday, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 1024 days.

(21) Appl. No.: 12/626,486

(22) Filed: Nov. 25, 2009

Related U.S. Application Data

(63) Continuation of application No. 11/264,368, filed on Oct. 31, 2005, now abandoned.

(51) Int. Cl.
*G06Q 20/00* (2012.01)
*G06F 17/30* (2006.01)

(52) U.S. Cl.
CPC .................................. *G06F 17/30887* (2013.01)

(58) Field of Classification Search
USPC ........................................................ 705/78
See application file for complete search history.

(56) References Cited

U.S. PATENT DOCUMENTS

| | | | |
|---|---|---|---|
| 6,363,384 B1 | 3/2002 | Cookmeyer, II et al. | |
| 6,871,220 B1 | 3/2005 | Rajan et al. | |
| 7,228,496 B2 | 6/2007 | Hamada | |
| 7,346,773 B2 | 3/2008 | Cam-Winget et al. | |
| 2002/0007343 A1 | 1/2002 | Oyama et al. | |
| 2002/0111888 A1 | 8/2002 | Stanley et al. | |
| 2002/0133410 A1* | 9/2002 | Hermreck et al. | 705/19 |
| 2002/0152106 A1 | 10/2002 | Stoxen et al. | |
| 2002/0178222 A1* | 11/2002 | O'Hara et al. | 709/205 |
| 2003/0031320 A1* | 2/2003 | Fan et al. | 380/255 |
| 2003/0046362 A1* | 3/2003 | Waugh et al. | 709/218 |
| 2003/0061131 A1 | 3/2003 | Parkan | |
| 2003/0097423 A1* | 5/2003 | Ozawa et al. | 709/219 |
| 2004/0078271 A1 | 4/2004 | Morano et al. | |
| 2005/0038722 A1 | 2/2005 | Throndson et al. | |
| 2005/0165871 A1* | 7/2005 | Barrs et al. | 707/205 |
| 2006/0212706 A1 | 9/2006 | Jiang et al. | |
| 2007/0016401 A1* | 1/2007 | Ehsani et al. | 704/9 |
| 2007/0033130 A1 | 2/2007 | Murray | |

* cited by examiner

*Primary Examiner* — Dante Ravetti
(74) *Attorney, Agent, or Firm* — Osha Liang LLP

(57) ABSTRACT

User data used or generated by an online application is stored by the online application on the client device, rather than entirely on the system hosting the online application.

19 Claims, 15 Drawing Sheets

2004 jack welch Tax Return

```
class="inset"><ol><li>Go to the <strong>File</strong> menu and select <br
/><strong>Save Page As...</strong></li><li>When the Save window appears, save the
file to your computer</li><li>Close this window</li></ol></div></div><div
class="shown" id="restore"><div class="head2">Continue My Return</div><div
class="inset"><p>Select <strong>Resume</strong> to continue your work</p></div>
```
1410

```
style="text-align:center;"><form
action="https://www.snaptax.com/secure/authapp/localrestoreform.do" id="transmitter"
method="post"><input class="submit" id="Restore" name="Restore" type="submit"
value="Resume" /><textarea name="xmldata" readonly="readonly"
style="visibility:hidden;width:10px;height:10px;overflow:hidden"><EncryptedSkiDat
a><CipherValue>DpHp5PrVLrTVbLcqcOl2xjP3nCOyKXDGYjot1qhqOulcV1GnEt5eUA==<
/CipherValue><CipherValue>CYUkQOj4nOhlaIRAo1IbBgPBxWQBMUleb3QoYfjDM4m7zL13X
oAsDkuOP4XQ0Cb1kSwSaeADz2O+VyDwTQ+b8fLs2r1k8rutP7m8qHnTsocKBrto4xLg7qR8+riqM6/uhJLae
Fd96XOYsWSBFX9k5SaF/i1b3Id9LKmTOPmfa4WVHoTuzpOWUmAquL18vFjfnBFimhjxVXrnZ5/O95TGp9GAc
DuzczhFLdrDmXK/2eg+c8bPc1QFNjhaCc1nTa6C4veKqckqHpOklczVJqpzmi330A3pi2qjRq24FeZze8Rot
oskopqMqcwjLvb4ep9skHthvcc55LhJQ4ReNoiA2aUccFQkUjyb1C2fMV9SmbNo8KQEwo/C38uzoIuRJtkb4
RsMLx+e1p5IJRYsqy4bwwaU4n8TobalzkYS3FigDpNk+saGtyTrDsu+7iimHIKQFgW1ygZjNfEQ6tB8C1+FY
i8FTHxUeAdxB3AMtk4FmJWaqJmg5J2JhJkoOLJzN93Iw6K10ZMppPDKndhYCooHaArjC1L5w6DAEn7hEjFxvp
LgIQvOibbUyOUKhd82i+63hjUjSbqZMO6omQxrUGZMp7880hLKRsKRDKVsm1cN3A/uN1zrCP1PN2KfMeYXzR
lo6s6sq8XnPfkIWU6ZqwxUsZfXW8xZvKD1FOdk7r9WO54wTzLmv7Wt38iPEYHzPkkKCoiTTb41nR6dM8p35w
dhR7FPIq5ozGpVsv2ADE2R4CCcaW2BGqz2sdHFCJML5BsEhLFHahT7Z7g8fUZ6aX8RotgsIA9rhpfM3V35QS
T947Tkmr+zryc7iZHJxFFinsOSxdG1CJblM/OFmvzQ++ApayvGvkwA7Rhv+WX2ZWEU2Htn9SbbH6XkAgyerH
rAoLxZ87eBWNv4+Moizg3Yry09wasEjLJgCyX1SOWQQpcTy5L39PWvz5ULCD1vwqzW7k2wbkz/GODhg6zHBd
f128vcvD7VJIivQ3r1Jt1MpM8zYB7410nmr7CB7ZSqXCkNnjW8fhSL6qLLq4rPRCQeXM+D6OlRmM5lRFfomV
weKDKDx/7lSWIIk8EDh5p8Zrb3hwlBWyfBZVxaIpXMKX1cQRzA/U9JLgy9H+Tny8caqmqNtrefxKxGrtX8R3
5hnl8dTKkeVioLdJrjpfOoH71MXyjxcv/PQ71LOFtzTObMyTGw8ejZYYCCr2OdPb/P54RjWtETY0a5VvxJzd
Q4oSGl+fsfpqdnjSfVJWI/ge7JEGIM7sEASgna6fD4GBCOwOT+fDB6/BbpfgNUSwJ/nuBDRnh191HmWcUeXr
rJmxPBVPu1pO1thVYuD17dS5w4YCpuFaUa6smO1NtGXdvTXoXKXBcy5alV4mpDEYEWQqLv4RVx9TvhT3EJOd
QCFu5sY2QU3zd4XPVLYEJIjFQ6UJJ22Y7c9NtIORq8BfUEGUlnKsXu8QZG7EfsfTu/gJOJOAappaX+D5E5UZ
CJQtMFxgD4psgH5fOjMUR/aTtg2rWgFATXhvahqyH3xdxTMdgVZowhmBR4gnN3c/urv6OKduEI4/F3pziTTf
7HGIyH1/n3W1lurCBxhS8ejgogxS2271aNfv00tmcGwYWBVGFmIGcohHCRyk3xsjJPgD2/Qwk9XiWQbz8ngv
517y/80/els2xP71DX1YURSEpS6uTRLvT2EYJtOchu87dPCiKktpMD6D/SWK307XCMftjx/kYSXUYLytF1SD
z+jnwjaOTQc96ZbWbbY4hQkwUrUgjiFz4VqQ5vfY8w4+UeKxiCqhRsgPgFwnIspEB1+u6DKaCzj0ffCAYBBx
0/Ionu2/9DwsHOAauZrdEr+i2EC6IPAGTcquxCxZsHFY5epyjzjDwwV8c72UbksrMp+xbFuBrFU3xRclGPdz
UPnP2VH7GiC0xBEXEsJ4gfiqoE9+vVYbT101eTobcFu6x3nLJ9GNxNZrMGMFmv0vI+U/8CXncW6uZpmLWNxy
7oBcbDBi+AQOzIcn1hwQVtUGmQMEV06Y/RspWCuqwyOQiTpHB+PwrQGGImRjUBhpZJSH+Lro9IO54PdjKMg+
DmOaxcKLWuQXO5OIOYCFQP87WVJFSDP+CjEpVILs1pTr3Qgs/NAz9c8EVNxS9KqIOkFSgthf9em8ZSubUOI1
/TheiTkYTk/wwGVIpPa6fPKA4drzvGgeLwJYFpT8suqmh1+Nxxj7+CkNFnVZ1yn603zgs3WcwNAPJgoVHhw2
y/zxXyuxqtWJ5uzRCx+cPoxYADtcW2SGrilehY9uY4HDny59n3FMQEy+r51ROM5yxktNoqpoJ9cvYYycFB7k
T+7IBhDUyUYdYpmY47parv+mPMg1wf2CdQEddsI1QnhEakUvRwN6JhvPg3uthUx7taKTQPHFCQnTcKpq6EA2
kIxur1DRaUJEL fpfpx4B2DEOungnpYYnz6aefms13LedyVE2ah9cqxBFybcTbHQDGqEK3Rm++cAmTRhofGfN
gtEIp08J+kWooOEFdnzHNoN2/mwwYTct/lnmXEtf6vdteOhztMDtr10eX+oZ+IYuKR1bMRJboC1D1gNY71Ya
exe42rM7ViriuHJBtGCrv0CaT4Srr3uMfSA9YSNihMDQfW9TnP6XkjT1gxYoh6XIugj7mC1mCizK+V5bpe9v
TxmBiNnOgLfcjmy9sHKXSOwBzwqzqwsRVi93J05FiMCN46L6bedTItsOzN4qzwzX6LssHIhEgvKdPTKRKNF4
jWmznfoXg56xF5Vuw+IMIqz9hf18KDsechbjXvRjr2WajlmLDrqwURNktvzVW1QxxpRSYQjaHo5Y9Fvr1kdw
rQ4BUPIuO9Iuf/NoHx1Y+71q8xshvUqU3PCYmzh16S1eKmv88EaFw1yFO8KW9JlUOOFcCwFdg+ATowaw/OAB
7b191+vWEUo4LWb6xVha+fMET1Xf1Z2Hd5qIAGOHcnV3NbGpesHhZelCSLCqwUw9Td2dO6ogEwaE3RP8DmDe
JOzed5F+p7pTBMf8HnOppsVGNRs/iuRBUkPdQr23fX9GweiqlvvZft60lJizrJsHkSGkekMe5T/lyMmKDAhD
AvCfme4sfuZAPYpTv2uyoNYpcfae6cJ90NAtbZbQs85JBojCWqXi3UBlDCIYryQNMPL4CGo7Xne8WV19jZAO
9ZSelCCJ6ItUQxJRWiKOm53DghbgajOtzxefxsvmTETLSfkGBWiUlDejGYekl/F7OqrfRdR4YmPCKAUYL9uq
74BbmZQWqZABTMfT7clNLdisZoCTxhLx+xekUPz/JkuHIHlc6c7J8HrOCfSml17zXpFmmq7M3RLsW+Bn0koB
Y5Vw1kMg1fGRCfyZd/ZmI1pXszTIcp1D399MAPx4D3pYxguSUqeL/Y45/jtbqqKw92+IeIILaFwRacWeJHhz
cOvMD9ziHUIMxBHKDVUqUAQZD09ZKr2VCUqTibeElppXhJ/luLa4VsxlVVfM+WMxHsO2MAbYv8I1QKx9FKj61
hdc3X/zrFdgx6oXPLdN2HIHTbJUXA/ajHjlUFjnBBc4Q6g3vJF89UlTxYerYJqe5eFVTL8d7tIQe/P9pffN3
whixFymA3M6WXOT0aUcjdHtRFGHedYcuy4d2GNOI2DLc9rXsswyswXMOQf13PNn6cp/RHOagJ3zyLy3xv1kes
QlEeuvlNV1kwhBwQ2rCdPfhexIfj8Sm1E/n18jgr/IaEXUF46vha8mkDgoXsyLojdYSkRQ3WwI9wK72Fe3Vg
8Rtd9wr4V+VMq1IY5TKJOFWYqntrFL/7G7EsrYH1uD15z14pFcTvLChUDVB+oHVtoSGcGOsufYCFPU1J/Ogz
NoHFhNWwsf9VGUoSUOHUzzYmthbJ4od1Dti9I+ozkwqVxKAAFBmpAnk5JSpgYWfzgKM5xipn3HbYDZN6wD1o
eyGjEXJG/NFLnCURx04RIIRgBy3JihQZxIJQwD8pX23ytd1wKjsPqnjOwG1QqUu/bd7odFFP5QuUPQV8519N
URu/IP2X/sXKrUxVKoY+v6NpsOwv3JwZRStOHKNp2DgthdsiIrc5IA7YGD145xIhoffcsvySWBXCvEwVLODi
ML7Ds6J9aX7W1DaC1VLwPAZGravqGRm+VUHMOLoejNYC9AxnqjTudsZ3KGTeGkWwtSFA6AbnMnNCqBKokarp
9BDY1LAWDUIgPFleYMCcZ9OdzYCHm+vG7peOIBhstsxjGrdmVuFCN9OqUUVI+qWuY51+RZiPOxgXnRLWKaTK
nPN7Dyv6mE2I54Z4tlocWoL8N6iteMJaakq3A59uyZEYWFKPCRKtuZliUHOZFJMIQmDWOOPCw65yPZKjBUV3
```

1420

Form 1040A

Department of Treasure Inernal Revenue Service
U.S. Individual Income Tax Return Form 1040A (2004)

Personal Information

| | | | |
|---|---|---|---|
| Your First Name | M.I. | Last Name | Suffix |
| jack | | welch | |

Date of Birth
01/31/1960

Social Security #
123-12-4321

| | | | |
|---|---|---|---|
| Spouse's First Name | M.I. | Last Name | Suffix |
| linda | | welch | |

Date of Birth
07/01/1980

Social Security #
321-23-4567

Street Address          Apartment No.
1 posh place

City                    State    ZIP Code
rancho santa fe         CA       92122

Check the boxes at the right if you or your spouse would like    ☐ You
to contribute $3 to the presidential election campaign fund.     ☐ Spouse

Filing Status

○ Single

○ Married - Filing Jointly

○ Married- Filing Separately

○ Head of Household - with qualifying person

○ Qualifying Widower - with dependent child

Exemptions

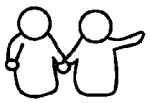

☐ Yourself - Check this box unless someone else can claim you as a dependent     0

☐ Spouse                                                                         0

Dependent #1                                                                     0

FIG.15

STORING ON A CLIENT DEVICE DATA PROVIDED BY A USER TO AN ONLINE APPLICATION

CROSS-REFERENCE TO RELATED APPLICATIONS

This application is a continuation of U.S. patent application Ser. No. 11/264,368, filed on Oct. 31, 2005, and assigned to assignee of the present application. Accordingly, this application claims benefit of U.S. patent application Ser. No. 11/264,368 under 35 U.S.C. §120. U.S. patent application Ser. No. 11/264,368 is hereby incorporated in its entirety.

BACKGROUND

1. Field of the Invention

The present invention relates generally to privacy and security of users' data provided to on-line services.

2. Description of the Related Art

To make online transactions more efficient and convenient, certain online services store users' personal information, such as name, address, credit card information, and other confidential user information, on servers for later retrieval and re-use. During retrieval, an on-line service must ensure that users can retrieve only their own information in order to protect privacy and security of other users' information.

Typically, to access their personal information, users need to provide a user name and password in a form. If the user's name and password are correct, the server authenticates the user and provides access to the user's data. If the provided user name and password are incorrect access is denied to a user.

This approach has the well-known problem that users often forget their user name or password for a particular service. Most services provide a way for a user to retrieve a user name and/or password by verifying their identity in other ways, such as answering specific questions. This approach still requires the user to remember particular information to access each different service, or alternatively (and less securely) use the same user name and password with every service.

Many online services do store a limited amount of information on a user's client computer in the form of a "cookie." However, this information is typically used to authenticate the user, and not to provide transactional or other complex or large bodies of data. This is because existing browsers typically limit the cookie size to 4 k of data, which is significantly less that would be used for storing complex data files.

SUMMARY

User data used or generated by an online application is stored by the online application on the client device, rather than entirely on the system hosting the online application. Storing the user data on a client device avoids the complexity of user authentication to the online application, puts a user in control of where and how his data is stored, enables the user to share the user data with other parties, and permits a user to copy or send the data to any other device for subsequent use or storage.

According to one embodiment of the present invention, a user accesses an online application on a server system using a web browser and enters user data into the online application; other user data may be generated by the online application. At any point, the user may request to store the entered data on a client device, for example, as part of pausing or terminating use of the online application. Upon the user's request, the user data is encrypted and embedded into a file (e.g., a web page or equivalent). The file with the embedded user data is then stored on a user-selected client device. A user can choose location of where the file will be stored on the client device. In one embodiment, the encryption is performed locally on the client device using an encryption application or browser plug-in. In another embodiment, the user data is transmitted to the server system, where it is encrypted and then transmitted back to the client device for storage.

When a user requests to restore the saved data (e.g., to continue use of the online application), a user opens the file stored on the client device. A user may open a link in the file and the encrypted data is transmitted to the server system. At the server system, the user data is decrypted and loaded into the online application with which the user was working. Alternatively, the local application may also be used to decrypt the user data and transmit it to the online application for loading. The online application generates a page with some or all of the loaded user data, which is then sent to the client device, where it is provided to a user. The application is restored to the same page or location where the user left off. As a result, a user can continue working with the online application where he or she left off. Unlike existing authentication mechanisms, a user does not need to provide a user name and password to restore the saved data. Authentication is provided instead by whatever existing authentication services are resident on the user's client device.

A system in accordance with one embodiment includes a server system in communication with a plurality of client devices via a network. The server system comprises a web server for servicing user requests, and an online application in communication with the server. The server system also includes a data saving module adapted to receive data provided by a user of an online application, invoke the encryption module to encrypt the user data, embed the data into a file, and send the file with the embedded data to the client device for storage. The server system also includes a data restoring module adapted to receive encrypted user data from the client device, in response to a user's request to restore the data. The data restoring module invokes a decryption module to decrypt the data, and then loads the decrypted data into the online application. The online application with the loaded user data is provided to the client device to be presented to a user of the online application.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

Figure 10:
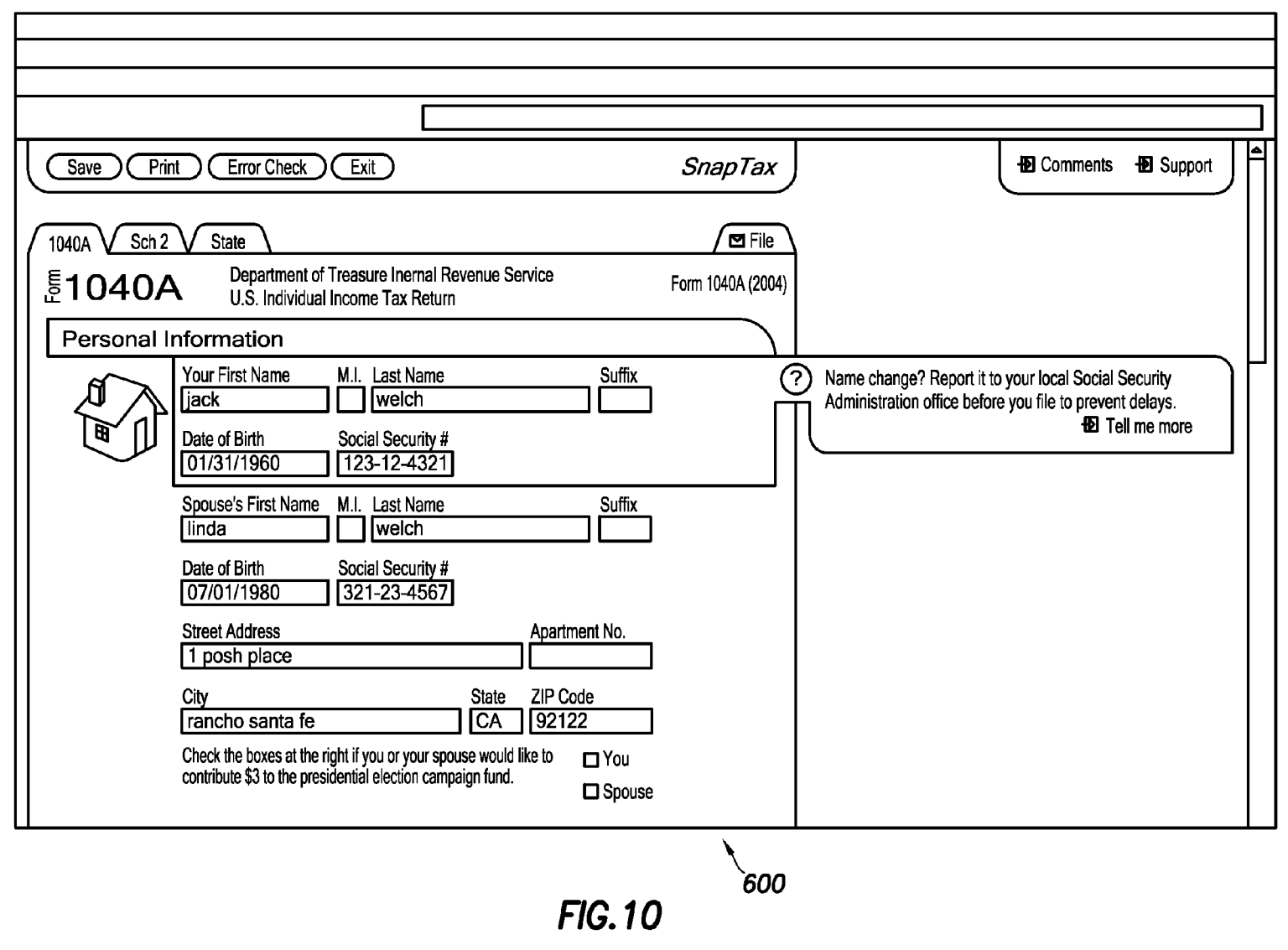

FIGS. 6-13 are screens presented to a user to accomplish saving and restoring data provided by a user to an online application.

FIG. 14 is a portion of an exemplary source file showing embedded user data in encrypted form.

FIG. 15 is screen presented to a user after the user data has been restored.

The figures depict one embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
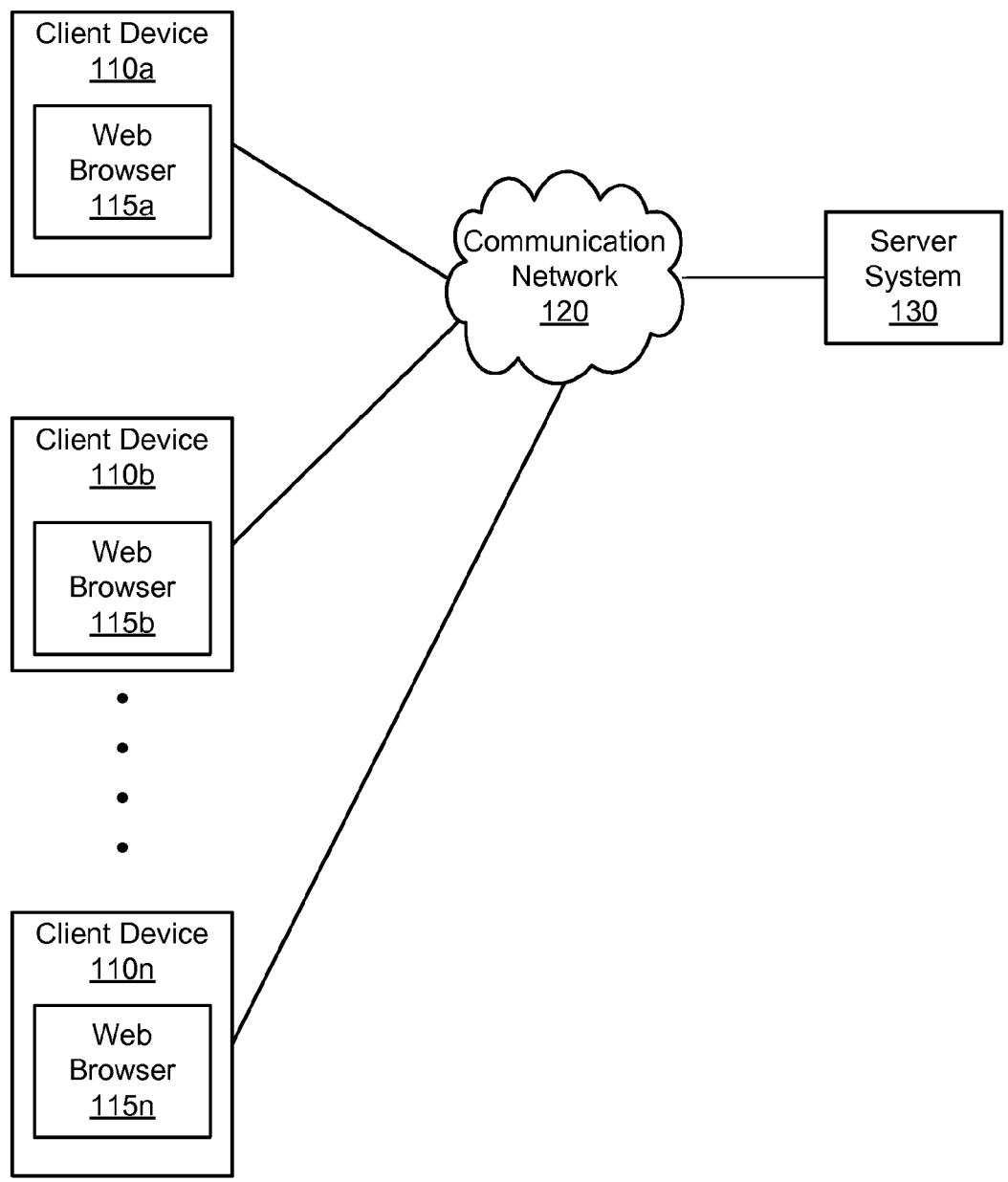
FIG. 1 is a block diagram of environment in which one embodiment of the invention operates.

FIG. 1 is a block diagram of environment 100 in which one embodiment of the invention operates. Environment 100 includes a plurality of client devices 110a through 110n (collectively referred to herein as "client device 110") associated with users and connected to a server system 130 by a communication network 120.

As used herein, the term "server system" 130 simply denotes those aspects of a collection of software programs associated with a remote computer system, as well as underlying operating system and hardware support that provides an online application service to the client devices 110. As will be understood by those of skill in the art, a server system 130 within the context of the present invention can comprise components of the software program, as well as components of the operating system of a remote computer and hardware components of a remote computer. In one embodiment, the server system 130 executes a tax-preparation application, such as SnapTax™ provided by Intuit, Inc. of Mountain View, Calif., or other software that assists a user in the preparation of tax information to be submitted to a taxing authority. The server system 130 may comprise one or more computers for implementing functionality of the present invention.

Users (not shown) access an online application executed on server system 130 using client devices 110. An online application comprises an application server 204 (shown in FIG. 2), a plurality of web pages (including both static and dynamically generated), classes, application data, and associated logic for handling user inputs, processing the input data, storing the input data, and retrieving additional data. A web page may use a variety of definitional and programming languages to control how information is presented. The application server 204 generates or retrieves various web pages based on user input, and provides the pages to the system server 130, which transmits them to the client device 110. Client device 110 loads web pages received from server system 130 and displays the web pages to a user. Client device 110 can be a personal computer, cellular telephone, personal digital assistant and other handheld device that employs web-browsing functionality. Client devices 110a-110n execute a web browser 115a-115n respectively for interpreting HTML or other display instructions in the web page and displaying the content accordingly. Web browser 115 includes additional functionality, such as a Java Virtual Machine, for executing JAVA® applets, ActiveX®, Flash®, and/or other applets or scripts technologies as available now or in the future.

Client device 110 also includes, for example, a storage device, like a hard drive, fixed or removable storage device, a processor, and an input device. Within the context of the present invention, client device 110 does not locally execute application programs adapted to process the data in the same manner as the online application provided by the server system 130. For example, where the server system 130 provides an online tax preparation application, then the client device 110 would not have a locally executable tax preparation application that can read and process the same user data. Similarly, if the online application is a financial management application (e.g., accounting, checkbook, trading, portfolio manager, etc.), then the client device 110 does not locally execute a similar financial management application. In some embodiments, as further described below, the client device 110 does not locally execute an encryption/decryption application as well. In other words, as least in some embodiments, the client device 110 can be a very minimally equipped computing device, providing access to the server system 130 and some other functionality substantially unrelated to the functionality of the online application, (e.g., telephony in a cell phone device).

Communication network 120 can be the Internet, and particularly, the World Wide Web portion thereof. However, it will also be appreciated that communication network 120 can be a LAN, WAN, intranet of any size, or any other communication that is capable of supporting communication between a client device 110 and a server system 130.

Figure 2:
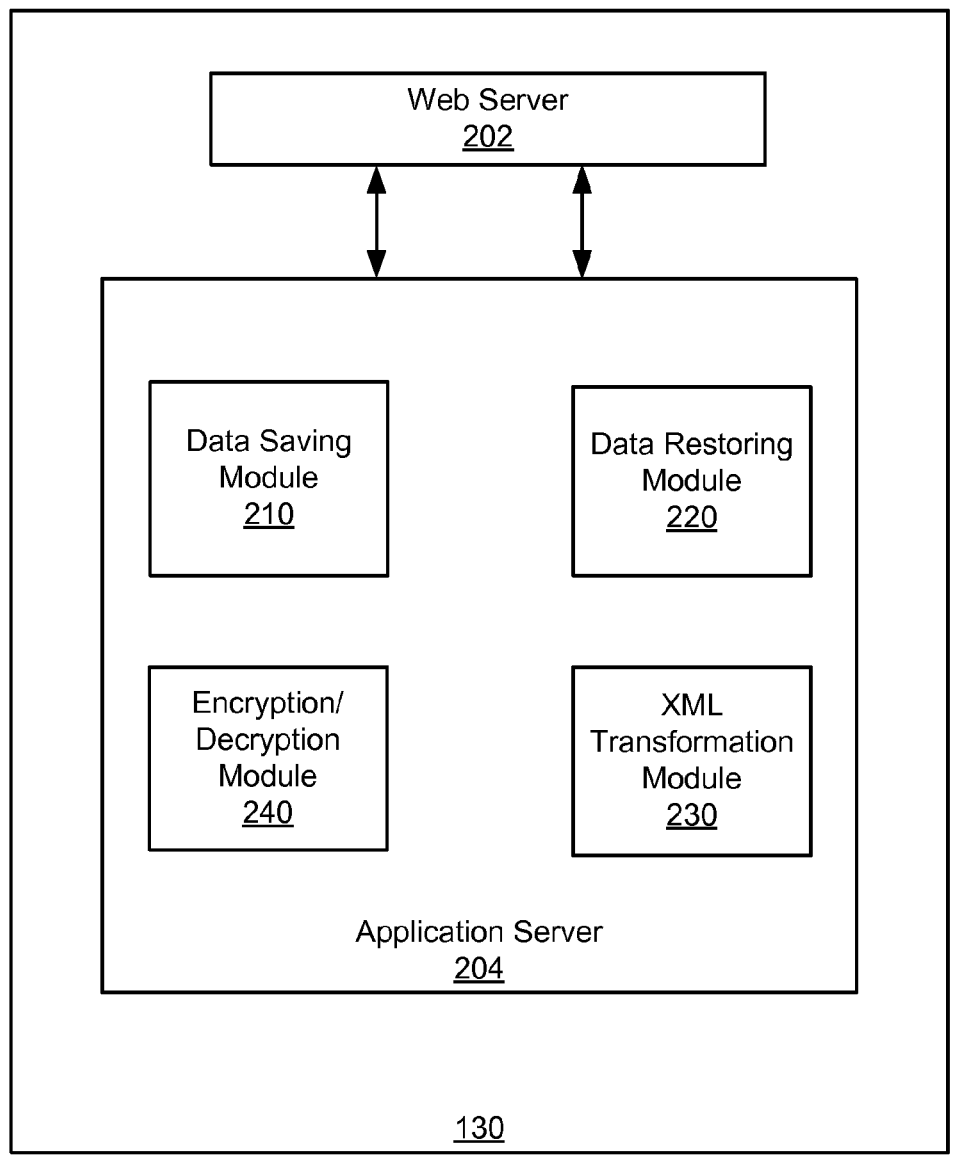
FIG. 2 is a block diagram of the components of a server system shown in FIG. 1 for performing functionality of the present invention.

Referring now to FIG. 2, a block diagram of the server system 130 is shown. Server system 130 includes a web infrastructure, such as a web server 202 and an application server 204. The web server 202 is an application for serving content across the communication network 120, such as for example Microsoft Internet Information Server (IIS), Apache, or any other system capable of presenting web content to a user. The web server 202 receives user requests from client device 110 to provide web pages and forwards the requests to the application server 204. The application server 204 processes the requests and returns a response via the web server 202 to the client device 110 in the form of web pages using any form of display programming across the communication network 120. The application server 204 provides the application processing logic for handling the user provided, application specific data for the desired functionality, such as tax preparation, online banking, portfolio management, scientific data analysis, accounting, just to name a few of the many different possible hosted application types.

Application server 204 executes data saving module 210, data restoring module 220, encryption/decryption module 240, and XML transformation module 230. The term "module" refers to computer program code and/or hardware adapted to provide the functionality attributed to the module, and which may have any type of implementation, for example, as a library file, script, object code, class, package, applet, and so forth.

Data saving module 210 is adapted to invoke the encryption/decryption module 240 to encrypt the user data used by an on-line application and store the data on the currently used client device (or any other network attached client device, such as another computer on the client's local network).

Data restoring module 220 is adapted to invoke the encryption/decryption module 240 to decrypt the user data and load the data into the on-line application with which a user was previously working, thereby restoring its state to the point at which the user left it.

Encryption/decryption module 240 is adapted to encrypt the user data. In one implementation, a symmetric encryption is used. Symmetric encryption is a type of encryption in which the same key is used to encrypt and decrypt data. In one embodiment, encryption/decryption module 240 is adapted to generate a key using an application programming interface (API) provided by IBM Corporation, of Armonk, N.Y., and use the key to encrypt the received data. In one embodiment, XSS4J algorithm provided by IBM Corporation is used to encrypt the data. However, one skilled in the art would understand that any possible API or application can be used to carry out the encryption function. Encryption/decryption module 240 is also adapted to decrypt the encrypted data using the same key. Other symmetric key algorithms can be used as well. Alternatively, asymmetric encryption methods may be used as well. Here, user data could be encrypted with a public key for the server system 130, and then decrypted using the complementary private key.

In an alternative embodiment, the client device 110 includes local equivalents of one or more of the data saving module 210, data restoring module 220, data encryption/decryption module 240, and XML transformation module 230, so that various operations described above are performed locally and/or in conjunction with server system 130.

Example Methods of Operation

1. Saving User Data

Figure 3:
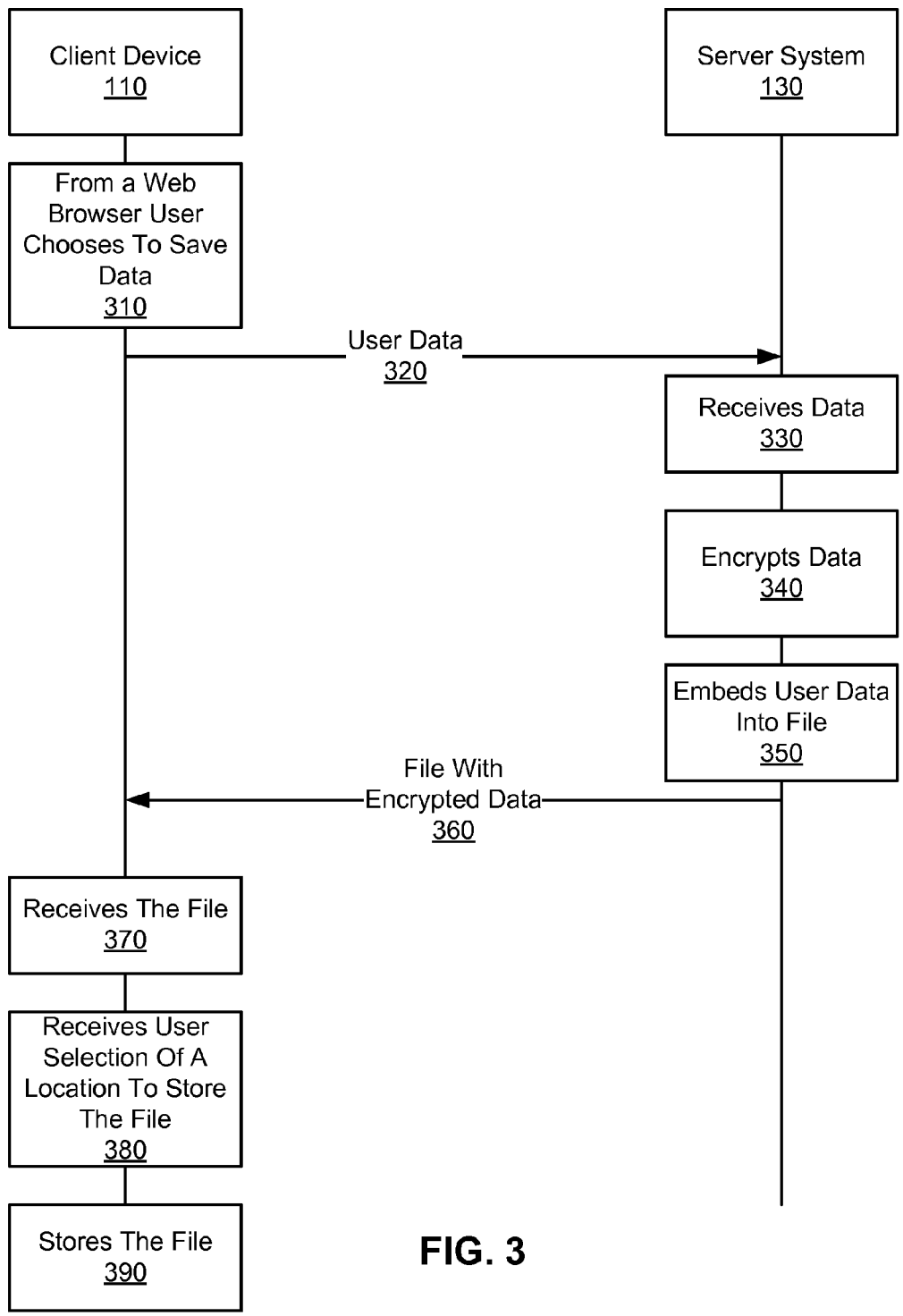
FIG. 3 is an event diagram of a method for storing user data on a client device according to an embodiment of the present invention.

FIG. 3 is an event diagram illustrating exemplary transactions performed by client device 110 and server system 130 to store user data. In FIG. 3, these entities are listed across the top. Beneath each entity is a vertical line representing the passage of time. The horizontal arrows between the vertical lines represent communication between the associated entities. It should be noted that not every communication between the entities is shown in FIG. 3. In other embodiments of the present invention, the order of the communication can vary.

Initially, a user at the client device 110 accesses via the communication network 120 an on-line application executed at the server system 130. The online application can be an online banking, portfolio management, scientific data analysis, accounting, just to name a few of the many different possible hosted application types.

To facilitate understanding of the operation of this embodiment of the present invention, event diagrams shown in FIGS. 3 and 4 will be described in conjunction with the screens shown in FIGS. 6-12, which are presented to a user working with the online application.

Figure 6:
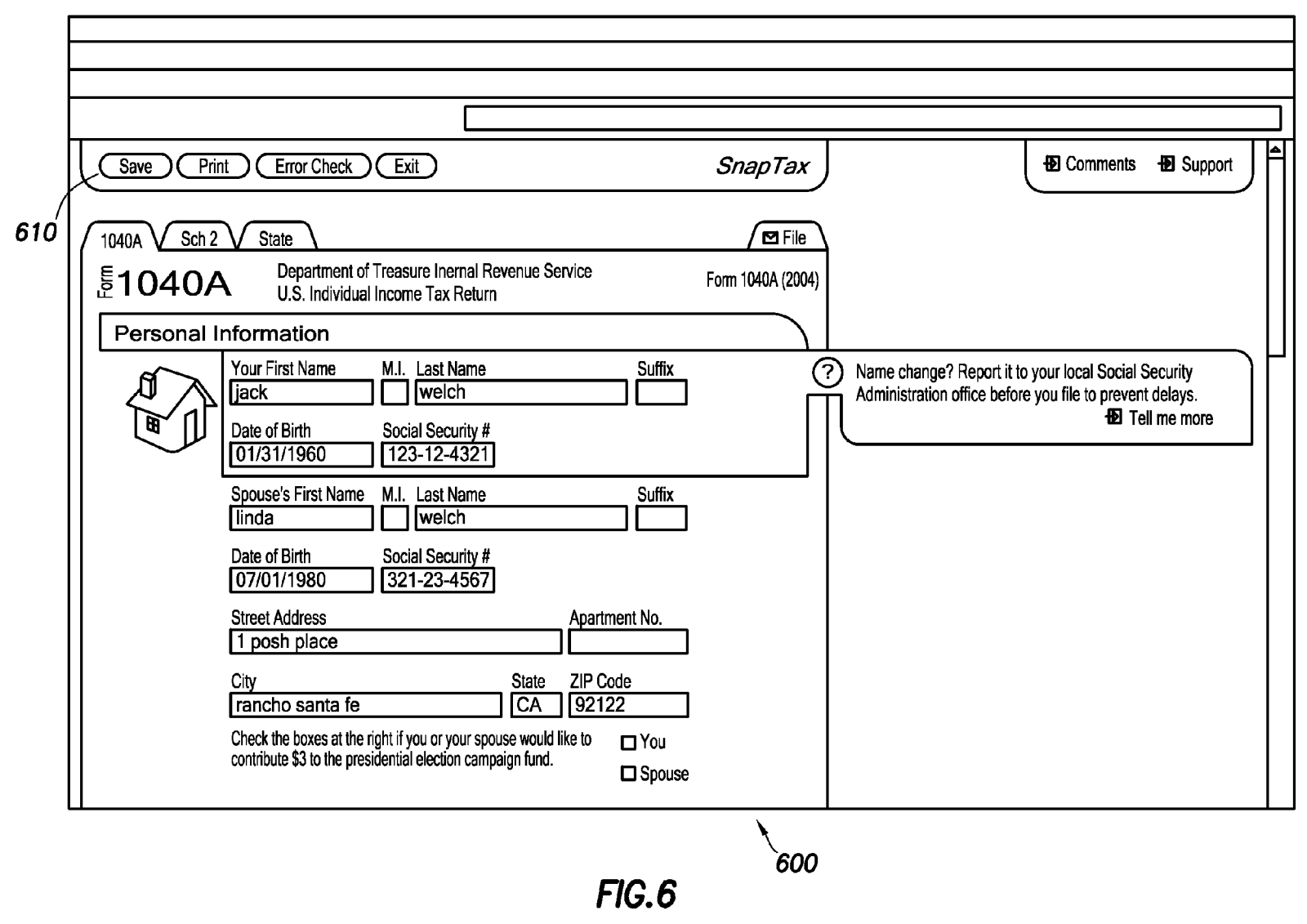
Figure 7:
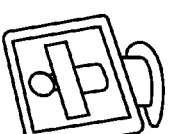

While working with the online application 600 executed on the server system 130 (e.g., as shown in FIG. 6), a user enters data into various data fields. In the illustrated example of FIG. 6, the data is tax-related data, including taxpayer's identification information (name, date of birth, and address), wages, salaries, taxable interest, and other tax-related information. The provided user data is stored in memory (not shown) of the client device 110. At some point, a user may choose to save the entered data so that the user can return to the online application 600 at a later time, for example, if the user does not have time to complete the application, or to back up the data, or simply move to another client device. To this end, at step 310, the user selects "save" feature 610 on a screen where the application 600 is displayed. Referring now to FIG. 7, in one embodiment, screen 700 is presented to a user that allows a user to save the user data. In one embodiment, when a user presses a "save" button 710, user-provided data is sent 310 to server system 130 and web browser 115 sends the user provided data to the server system 130 via, for example, the HTTP POST, HTTP GET, or any other protocol capable of transmitting data between the client device 110 and the server system 130.

Server system 130 receives 330 the data and optionally formats the data into an XML format. Server system 130 also encrypts 340 the data using any encryption algorithm.

Once the user data is encrypted, server system 130 embeds 350 the encrypted data into a file, such as an HTML, XHTML, a PDF file, or any file format capable of storing the encrypted data. The resulting file is provided to the web server 202. FIG. 14 is a portion of an exemplary source file 1400 showing a portion of the embedded encrypted data. The embedded encrypted data 1420 on FIG. 14 may include user-provided information such as taxpayer's address, social security number, wages, and other tax-related information. The file 1400 with embedded user data may optionally include an unencrypted summary of the user data such as a user's name and the amount of refund calculated by server system 130 based on the data provided by the user. The file 1400 also includes instructions 1415 on how to restore the saved data. Referring now to FIG. 3, server system 130 sends 360 the file to client device 110 for storage.

Figure 8:
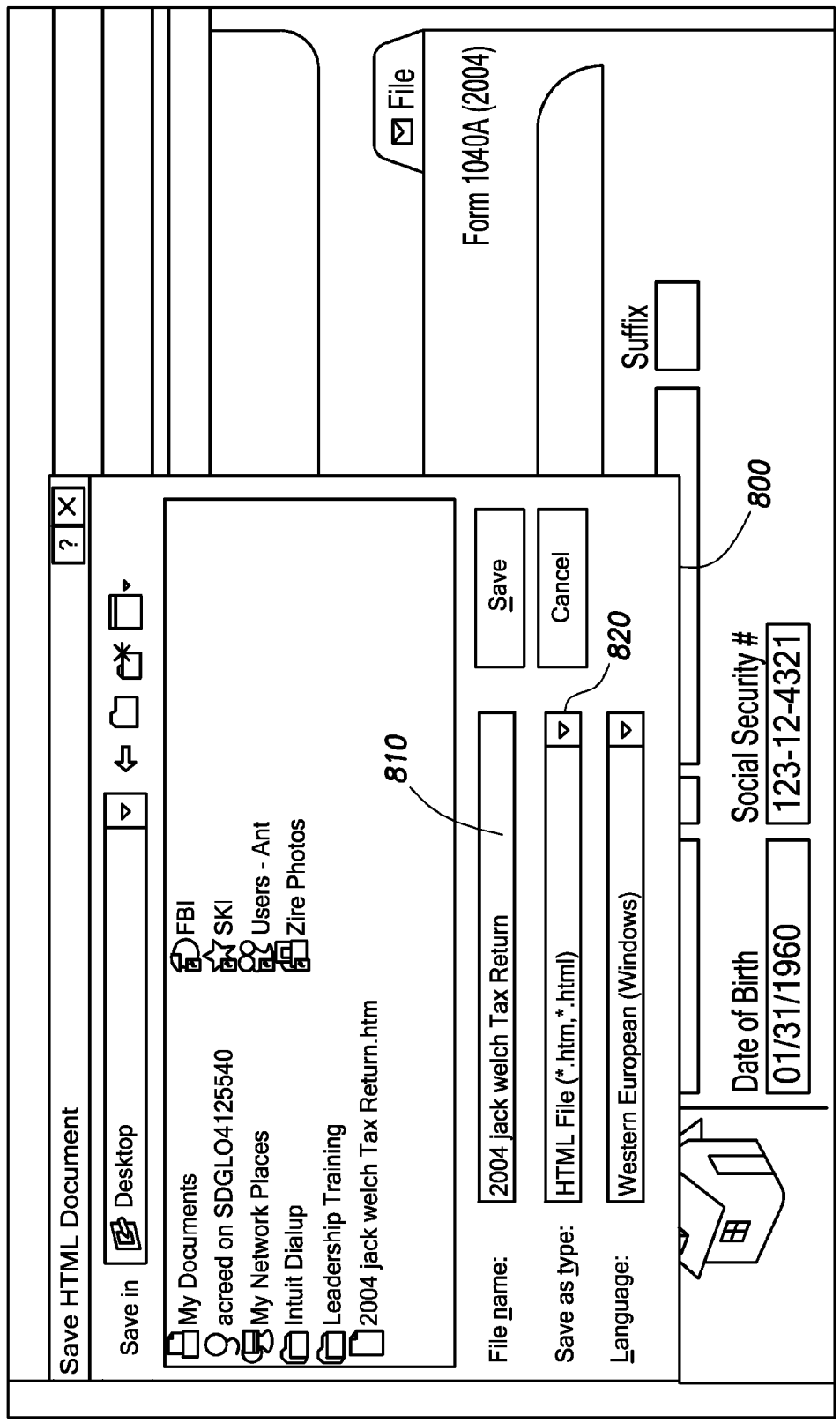

At step 370, client device 110 receives the file 1400 with the encrypted user data. A user is allowed to select a destination for storing the file. Referring now to FIG. 8, a "Save As" dialog screen 800 is presented to a user prompting a user to choose a location for file storage. The user may be offered a default name 810 for the file 1400 to be stored, but may choose any name. A user may choose to store the file on a storage device, like a hard drive, compact disk read-only memory (CD-ROM), DVD, some other form of fixed or removable storage device, or on any networked attached device, including other computers on the user's local network (or even on remote networks). A user can also copy or send the file 1400 to any other computing device for subsequent use or storage. At step 390, client device 110 stores the file 1400.

2. Restoring User Data

Figure 4:
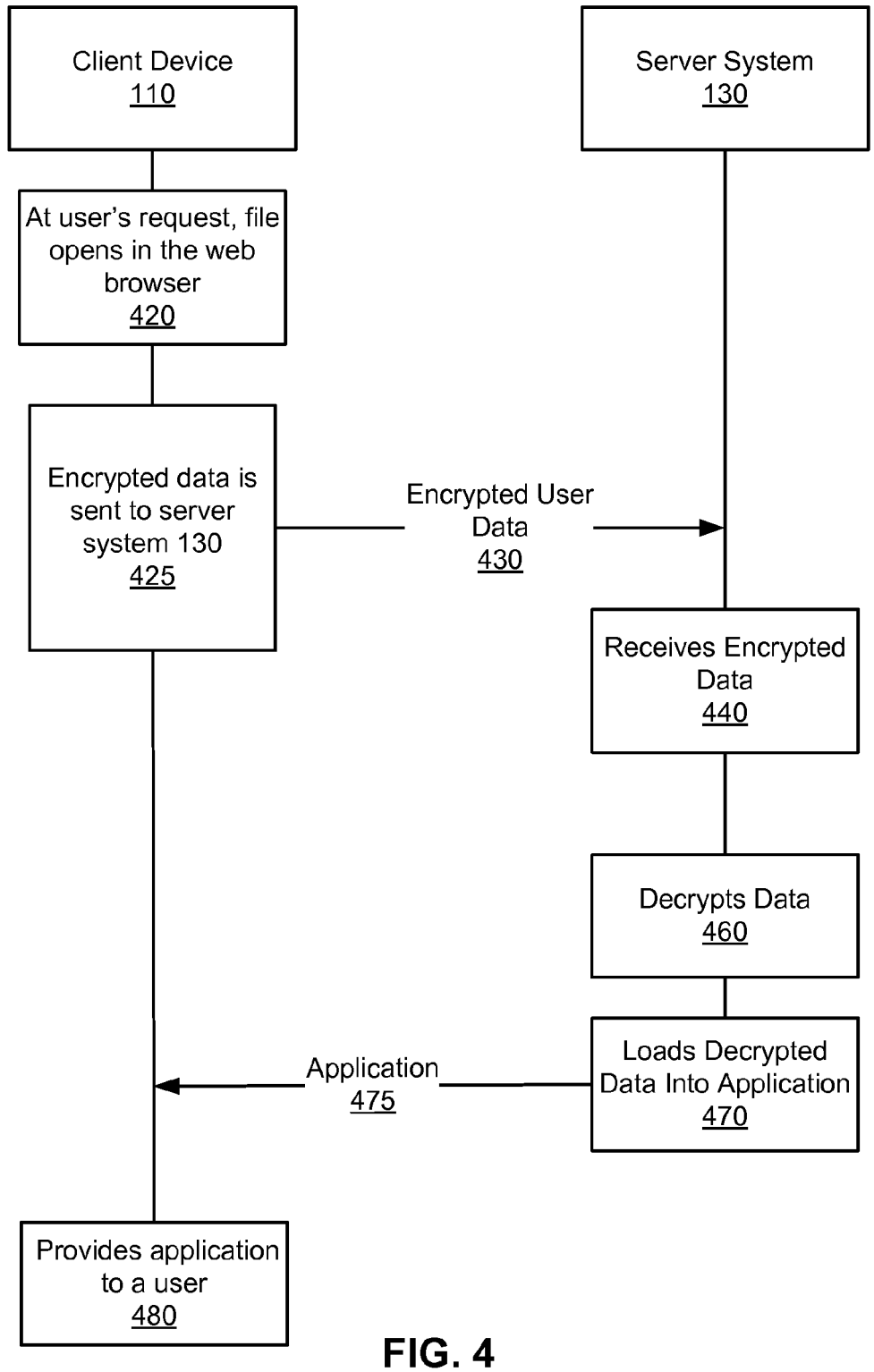
FIG. 4 is an event diagram of a method for restoring the user data according to one embodiment of the present invention.

FIG. 4 is an event diagram illustrating exemplary communications between client device 110 and server system 130 to restore user data saved on client device 110 according to one embodiment of the present invention. It should be noted that not every communication between entities is shown in FIG. 4. In other embodiments of the present invention, the order of the communication can vary.

Figure 9:
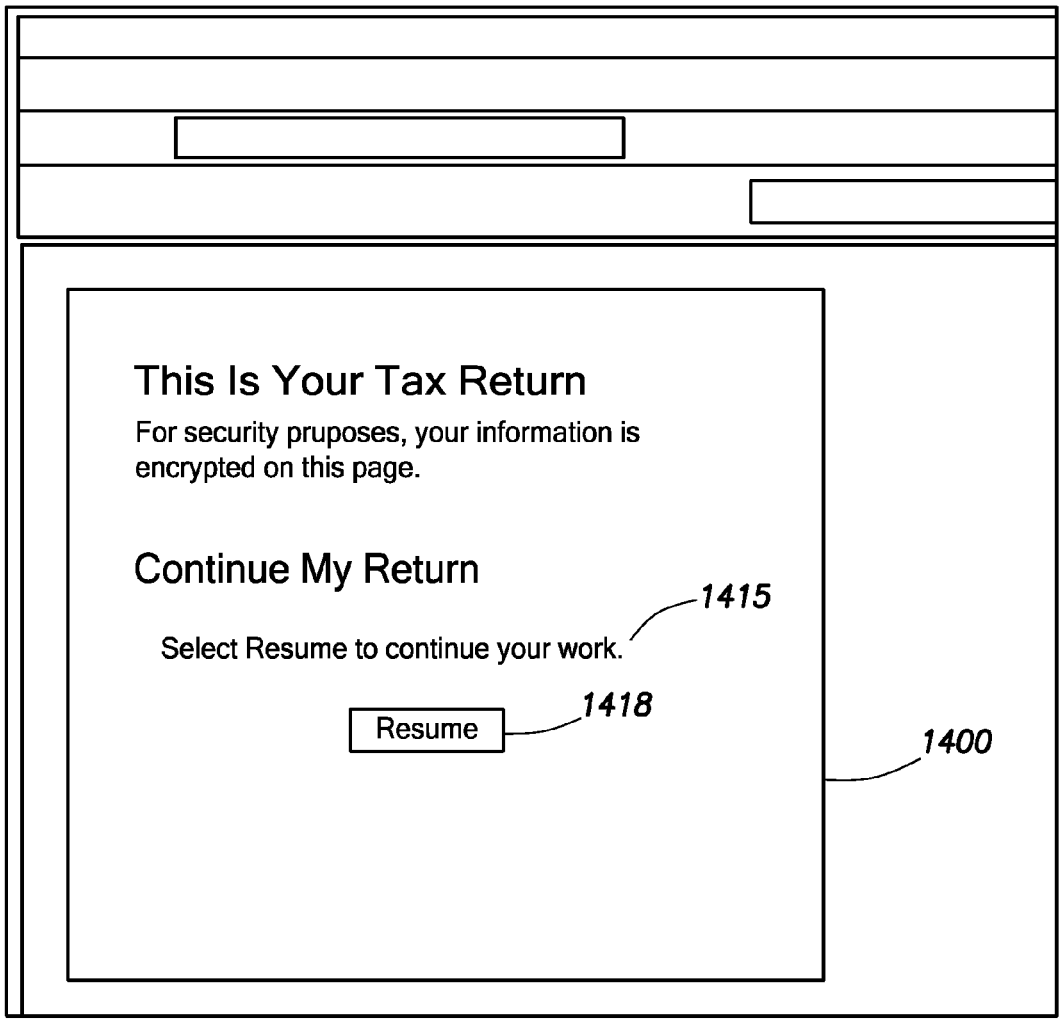

At some point, a user decides to complete the application 600. To this end, at step 420, a user opens the saved file 1400. The web browser 115 retrieves the data file 1400 and displays the file 1400 as a web page. Referring now to FIG. 9, file 1400 is shown in a form of a web page. The file 1400 includes instructions on how to restore the encrypted user data. For example, the file instructs a user: "Select Resume button to continue your work" 1415. As was previously described in reference to FIG. 14, the file 1400 also includes hidden encrypted user data that was provided to the online application 600. Referring again to FIG. 9, when a user clicks on "Resume" button 1418, web browser transmits 425 the data file to the web server 202. Web server 202 forwards the file 1400 to the data restoring module 220. The data restoring module 220 invokes 460 encryption/decryption module 240 to decrypt the data.

Once the user data is decrypted at step 460, server system 130 loads 470 the decrypted data into the online application 600 that is executed on the server system 130 and with which a user was previously working, thereby restoring its state to the point at which the user left it. The online application 600 generates a page with some or all of the loaded user data, which is then sent 475 to the client device 110, where it is provided 480 to a user. The application 600 is restored to the same page or location where the user left off. As a result, a user can continue working with the online application where he or she left off. FIG. 15 illustrates a page with all of the loaded user data after the data has been restored. As shown in FIG. 15, all the data provided by the user to the on-line application 600 is displayed to the user so that the user can continue working with the application 600 from where the user left off.

Thus, storing on a client device data provided by a user to an online application puts a user in control of where and how their data is stored, enables the user to share the online application data with other parties, and permits the user to copy or send his data to any other device for subsequent use or storage. Unlike existing authentication mechanisms, the user does not need to provide a user name and password to the online application or system server to restore the saved data, thereby reducing the burden of existing authentication mechanisms.

Figure 5:
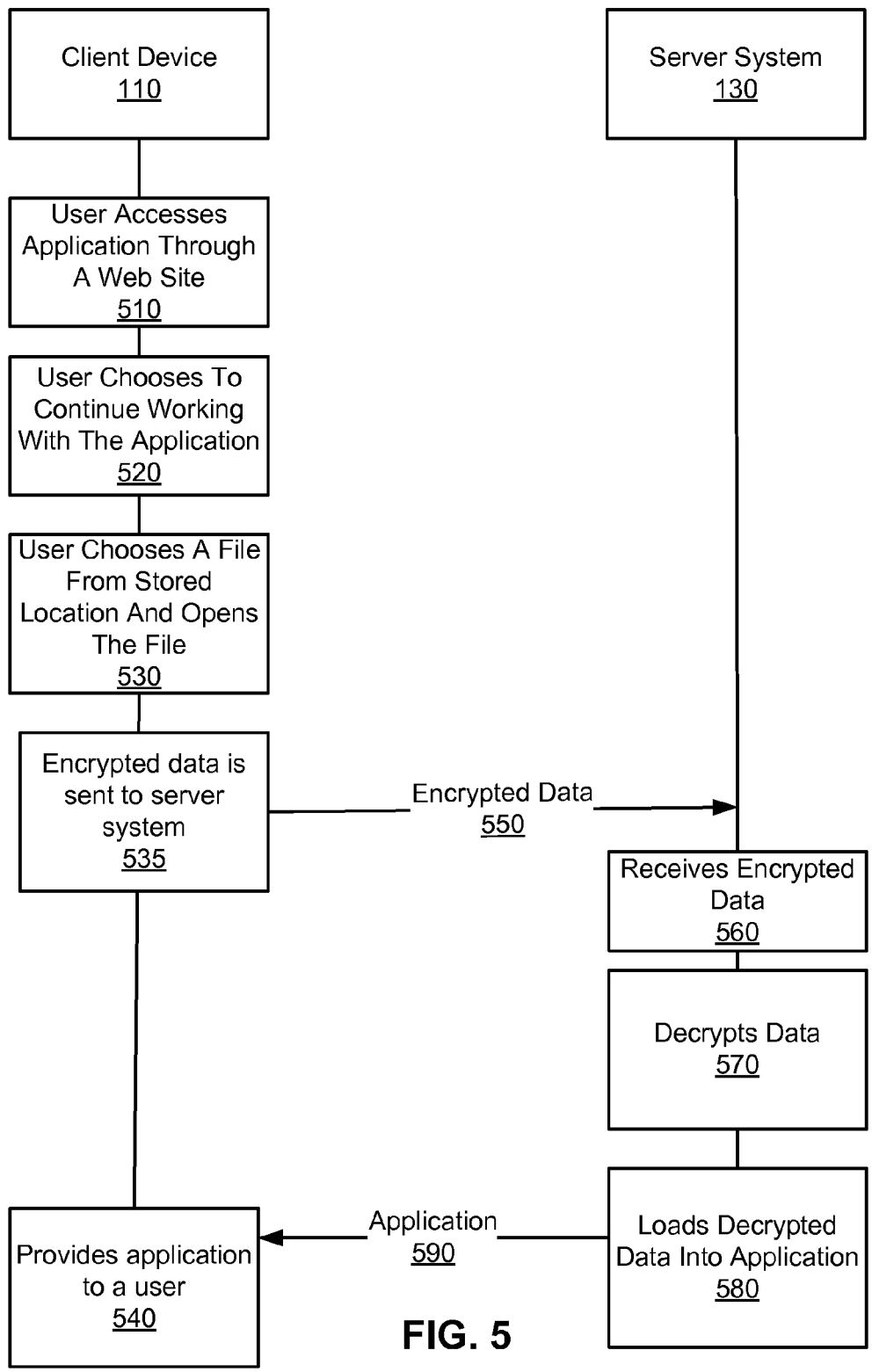
FIG. 5 is an event diagram of a method for restoring the user data according to another embodiment of the present invention.
Figure 11:
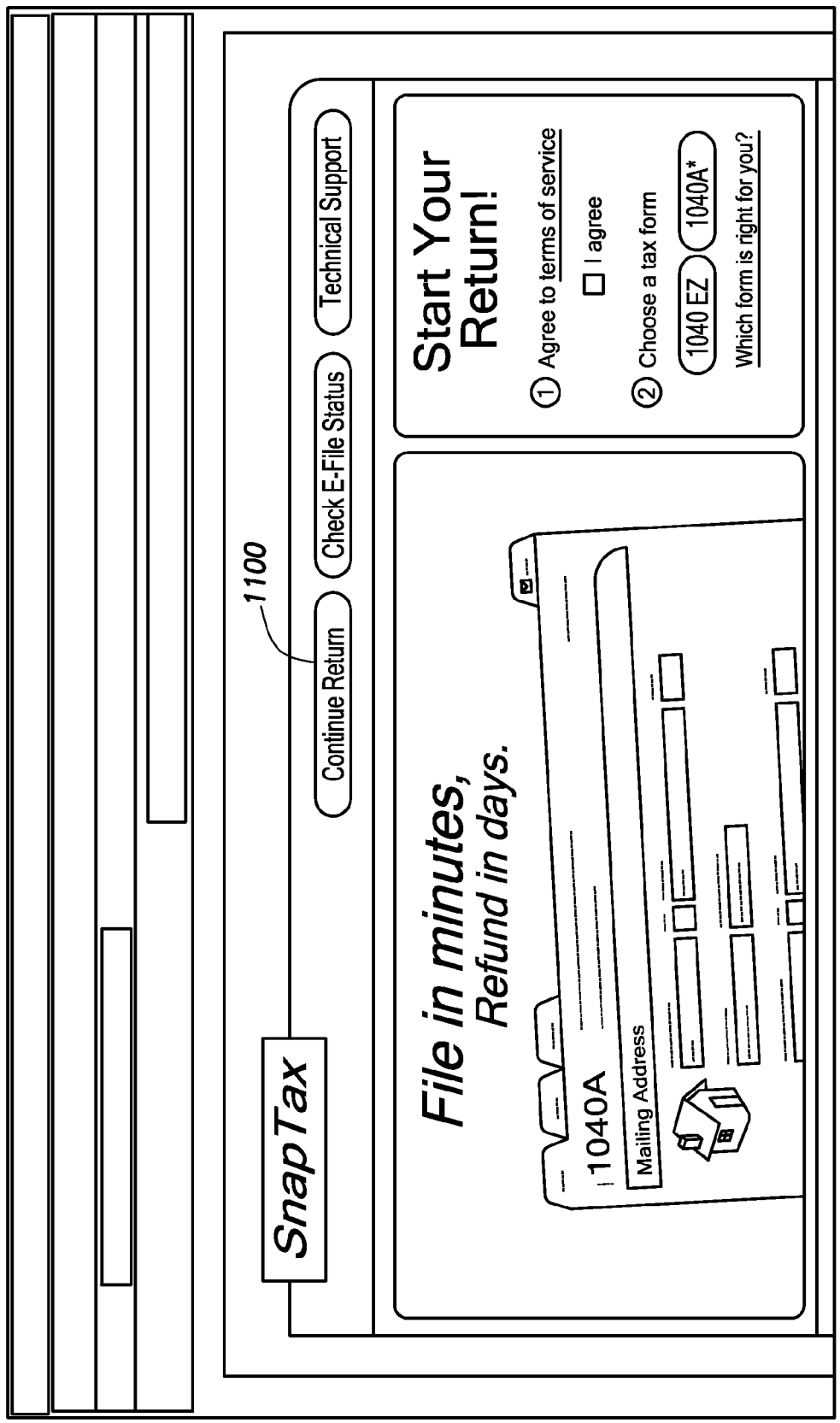
Figure 12:
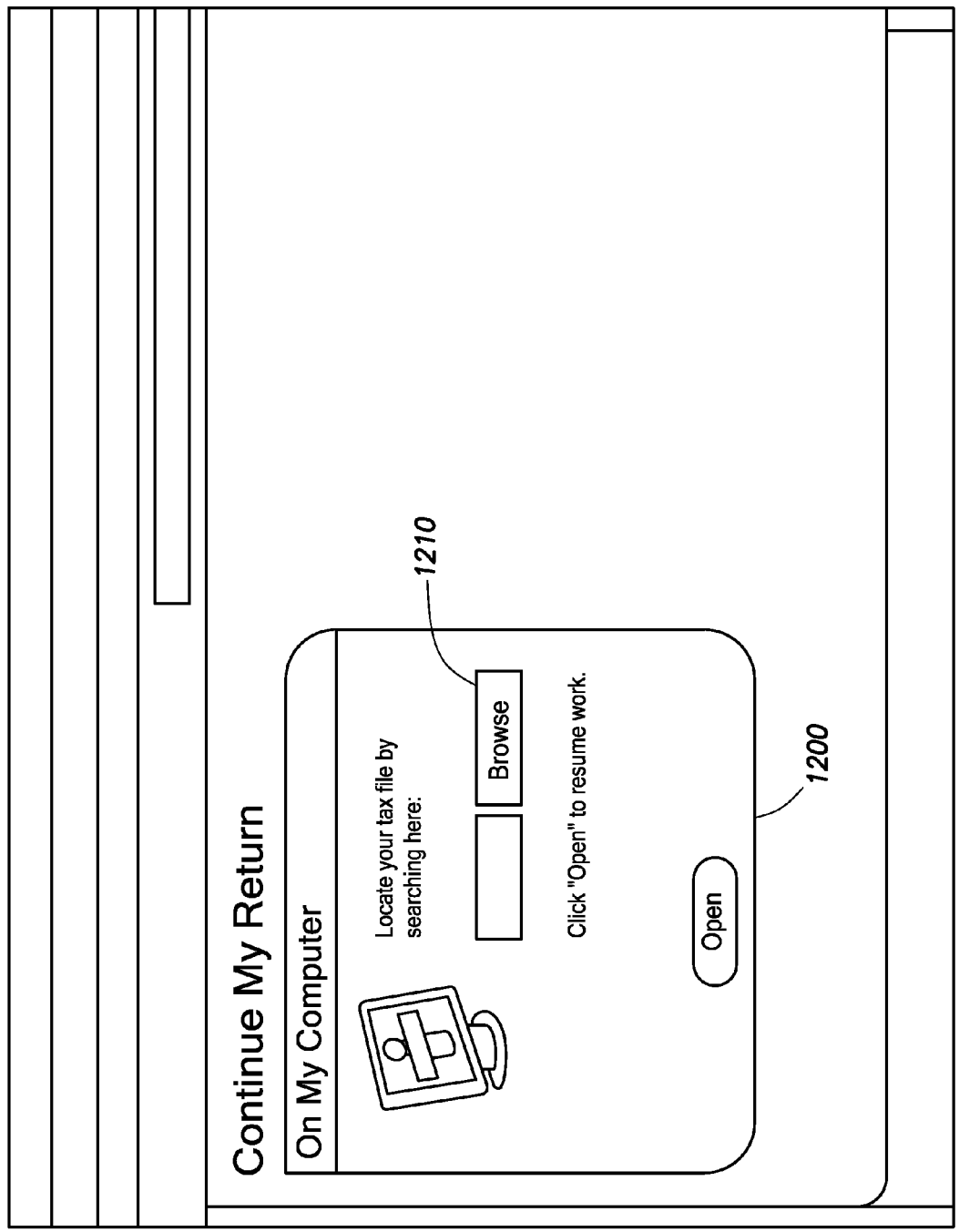
Figure 13:
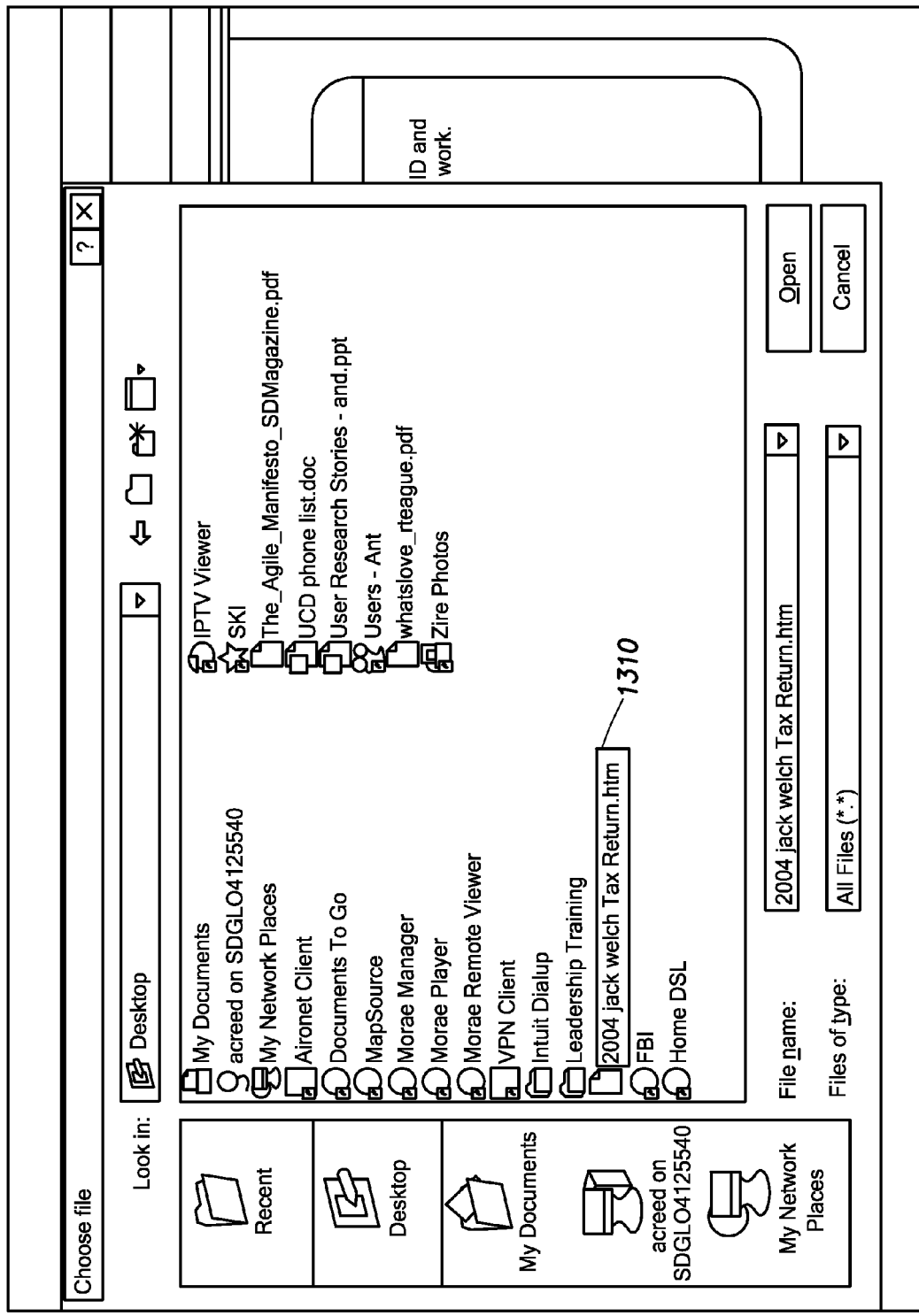

FIG. 5 is an event diagram illustrating an alternative embodiment for restoring locally saved user data. In this embodiment, a user accesses 510 a website that executes the online application 600 with which a user was working. Referring now to FIG. 11, a user selects "Continue Return" 1100 feature, at which point the user is presented with a "Continue My Return" 1200 web page, as shown in FIG. 12. When a user clicks on a "Browse" 1210 button, the web browser 115 displays a "Choose File" dialog screen 1300, which is shown in FIG. 13. A user chooses a file 1310 from a stored location and opens the file.

Referring again to FIG. 5, when a user chooses 530 the file from a stored location, the encrypted data is sent 550 to server system 130. Server system 130 receives 560 the encrypted data, decrypts 570 the data, and loads 580 the decrypted data into the online application 600 executed on the server system 130. The online application 600 generates a page with some or all of the loaded user data, which is then sent to the client device 110, where it is provided 540 to a user. The application 600 is restored to the same page or location where the user left off. Referring again to FIG. 15, application page 600 is displayed to a user with the previously entered user data. The user can continue working with the application 600 from where the user left off.

The present invention has been described in particular detail with respect to several embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for managing data items, comprising:
    initiating, by a client device, a first session of an online application (OA) executing on a server;
    receiving, by the client device and in response to initiating the first session, a webpage comprising a plurality of fields from the OA;
    receiving, by the client device, a first data item from a user of the client device;
    populating, by the client device, a first field of the plurality of fields with the first data item;
    receiving, by the client device and after populating the first field, a request to save the first data item from the user and a location on the client device selected by the user to save the first data item;
    sending, by the client device and in response to the request, the first data item from the client device to the OA executing on the server, wherein the OA generates an encrypted version of the first data item and embeds the encrypted version of the first data item in a file;
    receiving, by the client device, during the first session, and in response to sending the first data item, the file from the OA and saving the file at the location on the client device;
    receiving, by the client device, a selection of the file from the user after the first session of the OA is terminated;
    sending, by the client device and after receiving the selection, the encrypted version from the client device to the OA during a second session of the OA, wherein the OA restores the first data item by decrypting the encrypted version of the first data item received from the client device;
    receiving, by the client device, from the OA, and in response to sending the encrypted version of the first data item, the webpage comprising the first field loaded, by the OA, with the first data item during the second session; and
    displaying, by the client device and during the second session, the webpage comprising the first field loaded, by the OA, with the first data item,
    wherein the second session is subsequent to the first session.

2. The method of claim 1, further comprising:
    receiving, by the client device and during the second session, a second data item from the user;
    populating, by the client device and during the second session, a second field of the plurality of fields with the second data item;
    sending, by the client device and during the second session, the first data item and the second data item to the OA, wherein the OA calculates a value based on the first data item and the second data item.

3. The method of claim 2, wherein the first data item and the second data item are tax-related items, wherein the OA is a tax return preparation application, and wherein the OA populates at least one field of a tax return based on the value.

4. The method of claim 1, further comprising opening, using the client device, the file before sending the encrypted version of the first data item to the OA executing on the server.

5. The method of claim 4, wherein the file comprises a link to initiate sending the encrypted version of the first data item from the client device to the OA executing on the server.

6. The method of claim 4, wherein the file comprises instructions for presenting, on the client device, a button to initiate sending the encrypted version of the first data item from the client device to the OA executing on the server.

7. A non-transitory computer readable storage medium storing instructions for managing data items, the instructions, when executed by a processor of a client device, cause the processor to perform the steps of:
    initiating a first session of an online application (OA) executing on a server;
    receiving, in response to initiating the first session, a webpage comprising a plurality of fields from the OA;
    receiving, a first data item from a user of the client device;
    populating, a first field of the plurality of fields with the first data item;
    receiving, after populating the first field, a request to save the first data item from the user and a location on the client device selected by the user to save the first data item;
    sending, in response to the request, the first data item from the client device to the OA executing on the server, wherein the OA generates an encrypted version of the first data item and embeds the encrypted version of the first data item in a file;
    receiving, during the first session, and in response to sending the first data item, the file from the OA, and save the file at the location on the client device;
    receiving a selection of the file from the user after the first session of the OA is terminated;
    sending, after receiving the selection, the encrypted version from the client device to the OA during a second session of the OA, wherein the OA restores the first data item by decrypting the encrypted version of the first data item received from the client device;
    receiving, from the OA and in response to sending the encrypted version of the first data item, the webpage comprising the first field loaded, by the OA, with the first data item during the second session; and
    displaying, during the second session, the webpage comprising the first field loaded, by the OA, with the first data item,
    wherein the second session is subsequent to the first session.

8. The non-transitory computer readable storage medium of claim 7, the instructions, when executed by the processor of the client device, further causing the processor to perform the steps of:
    receiving, during the second session, a second data item from the user;
    populating, during the second session, a second field of the plurality of fields with the second data item;
    sending, during the second session, the first data item and the second data item to the OA, wherein the OA calculates a value based on the first data item and the second data item.

9. The non-transitory computer readable storage medium of claim 8, wherein the first data item and the second data item are tax-related items, wherein the OA is a tax return preparation application, and wherein the OA populates at least one field of a tax return based on the value.

10. The non-transitory computer readable storage medium of claim 7, the instructions further comprising functionality to open the file using the client device before sending the encrypted version of the first data item to the OA executing on the server.

11. A method for managing data items, comprising:
    receiving, by an online application (OA) executing on a server, a request from a client device to initiate a first session;

sending, by the OA executing on the server and in response to receiving the request, a webpage comprising a plurality of fields to the client device;

receiving, by the OA executing on the server, a first data item from the client device, wherein the client device populates a first field of the plurality of fields with the first data item;

generating, by the OA executing on the server, an encrypted version of the first data item and embedding the encrypted version in a file;

sending, by the OA executing on the server, the file to the client device during the first session, wherein the file is saved at a location on the client device specified by a user of the client device during the first session;

receiving, by the OA executing on the server and from the client device, the encrypted version of the first data item during a second session;

restoring, using the OA executing on the server, the first data item by decrypting the encrypted version of the first data item received from the client device;

loading, by the OA executing on the server, the first data item into the first field of the plurality of fields on the webpage after restoring the first data item; and sending, by the OA executing on the server, the webpage with the first field loaded with the first data item to the client device during the second session, wherein the second session is subsequent to the first session.

12. The method of claim 11, further comprising:

receiving, by the OA executing on the server and after sending the webpage with the first field loaded with the first data item, the first data item and a second data item from the client device;

calculating, by the OA executing on the server and during the second session, a value based on the first data item and the second data item; and populating, by the OA executing on the server, at least one field of a tax return based on the value, wherein the first data item and the second data item are tax related data items, and wherein the OA is a tax return preparation application.

13. The method of claim 11, wherein the file comprises instructions for presenting, on the client device, a button for selection by the user to send the encrypted version of the first data item from the client device to the OA.

14. A non-transitory computer readable storage medium storing instructions for managing data items, the instructions, when executed by a processor of a server, causes the processor to perform the steps of:

receiving a request from a client device to initiate a first session;

sending, in response to receiving the request, a webpage comprising a plurality of fields to the client device;

receiving a first data item from the client device, wherein the client device populates a first field of the plurality of fields with the first data item;

generating, during the first session, an encrypted version of the first data item and embed the encrypted version in a file;

sending the file to the client device during the first session, wherein the file is saved at a location on the client device specified by a user of the client device during the first session;

receiving, from the client device, the encrypted version of the first data item during a second session;

restoring the first data item by decrypting the encrypted version of the first data item received from the client device;

loading the first data item into the first field of the plurality of fields on the webpage after restoring the first data item; and sending the webpage with the first field loaded with the first data item to the client device during the second session, wherein the second session is subsequent to the first session.

15. The non-transitory computer readable storage medium of claim 14, the instructions, when executed by the processor of the server, further causes the processor to performs the steps of:

receiving, after sending the webpage with the first field loaded with the first data item, the first data item and a second data item from the client device;

calculating, during the second session, a value based on the first data item and the second data item; and populating at least one field of a tax return based on the value, wherein the first data item and the second data item are tax related data items, and wherein the OA is a tax return preparation application.

16. A server for managing data items, comprising:

a processor;

a memory operatively connected to the processor; and a plurality of software instruction stored in the memory, the plurality of software instructions, when executed, cause the processor to perform the steps of:

receiving a request from a client device to initiate a first session;

sending, in response to receiving the request, a webpage comprising a plurality of fields to the client device;

receiving a first data item from the client device, wherein the client device populates a first field of the plurality of fields with the first data item;

generating, during the first session, an encrypted version of the first data item and embed the encrypted version in a file;

sending the file to the client device during the first session, wherein the file is saved at a location on the client device specified by a user of the client device during the first session;

receiving, from the client device, the encrypted version of the first data item during a second session;

restoring the first data item by decrypting the encrypted version of the first data item received from the client device;

loading the first data item into the first field of the plurality of fields on the webpage after restoring the first data item; and sending the webpage with the first field loaded with the first data item to the client device during the second session, wherein the second session is subsequent to the first session.

17. The server of claim 16, the plurality of software instructions, when executed, further causing the processor to perform the steps of:

receiving, after sending the webpage with the first field loaded with the first data item, the first data item and a second data item from the client device;

calculating, during the second session, a value based on the first data item and the second data item; and populating at least one field of a tax return based on the value, wherein the first data item and the second data item are tax related data items.

18. A client device for managing data items, comprising:
a processor;
a memory operatively connected to the processor; and
a plurality of software instruction stored in the memory, the plurality of software instructions, when executed, cause the processor to perform the steps of:
- initiating a first session of an online application (OA) executing on a server;
- receiving, in response to initiating the first session, a webpage comprising a plurality of fields from the OA;
- receiving a first data item from a user of the client device;
- populating a first field of the plurality of fields with the first data item;
- receiving, after populating the first field, a request to save the first data item from the user and a location on the client device specified by the user to save the first data item;
- sending, in response to the request, the first data item from the client device to the OA executing on the server, wherein the OA generates an encrypted version of the first data item and embeds the encrypted version of the first data item in a file;
- receiving, during the first session and in response to sending the first data item, the file from the OA, and save the file at the location on the client device;
- receiving a selection of the file from the user after the first session of the OA is terminated;
- sending, after receiving the selection, the encrypted version from the client device to the OA during a second session of the OA, wherein the OA restores the first data item by decrypting the encrypted version of the first data item received from the client device;
- receiving, from the OA and in response to sending the encrypted version of the first data item, the webpage comprising the first field loaded, by the OA, with the first data item during the second session; and
- displaying, using the client device and during the second session, the webpage comprising the first field loaded, by the OA, with the first data item,
- wherein the second session is subsequent to the first session.

19. The client device of claim 18, the plurality of software instructions, when executed, cause the processor to perform the steps of:
- receiving, during the second session, a second data item from the user;
- populating, during the second session, a second field of the plurality of fields with the second data item;
- sending, during the second session, the first data item and the second data item from the client device to the OA, wherein the OA calculates a value based on the first data item and the second data item.

* * * * *